(12) United States Patent
McGonegal

(10) Patent No.: US 7,646,675 B1
(45) Date of Patent: Jan. 12, 2010

(54) UNDERWATER RECOGNITION SYSTEM INCLUDING SPEECH OUTPUT SIGNAL

(76) Inventor: Ralph McGonegal, 205 S. Sandstone Rd., Jackson, MI (US) 49201

( * ) Notice: Subject to any disclaimer, the term of this patent is extended or adjusted under 35 U.S.C. 154(b) by 0 days.

(21) Appl. No.: 11/903,198

(22) Filed: Sep. 19, 2007

Related U.S. Application Data

(60) Provisional application No. 60/845,674, filed on Sep. 19, 2006, provisional application No. 60/931,822, filed on May 25, 2007.

(51) Int. Cl.
*G01S 15/88* (2006.01)
(52) U.S. Cl. ........................ 367/116; 367/107
(58) Field of Classification Search ................ 367/107, 367/115, 116
See application file for complete search history.

(56) References Cited

U.S. PATENT DOCUMENTS

| | | | |
|---|---|---|---|
| 3,706,068 A | 12/1972 | Bradshaw et al. | 367/116 |
| 4,135,188 A | 1/1979 | Bickley, Jr. et al. | 342/115 |
| 4,234,941 A | 11/1980 | Welland, Jr. et al. | 367/116 |
| 4,489,405 A | 12/1984 | Tendler | 367/116 |
| 4,616,350 A | 10/1986 | Tendler | 367/116 |
| 4,621,348 A | 11/1986 | Tendler | 367/116 |
| 4,672,590 A | 6/1987 | Tendler | 367/116 |
| 4,679,177 A * | 7/1987 | Aoyagi et al. | 367/132 |
| 4,870,687 A | 9/1989 | DeLeon | 704/270 |
| 4,943,951 A | 7/1990 | Leavell et al. | 367/111 |
| 5,097,856 A | 3/1992 | Chi-Sheng | 135/72 |
| 5,537,380 A | 7/1996 | Sprankle, Jr. et al. | 367/111 |
| 5,572,625 A | 11/1996 | Raman et al. | 704/260 |
| 5,758,320 A | 5/1998 | Asano | 704/258 |
| 6,115,482 A | 9/2000 | Sears et al. | 382/114 |
| 6,198,692 B1 | 3/2001 | Sekine | 367/11 |
| 6,199,042 B1 | 3/2001 | Kurzweil | 704/260 |
| 6,396,433 B1 | 5/2002 | Clodfelter | 342/22 |
| 6,965,862 B2 | 11/2005 | Schuller | 704/258 |
| 2003/0056592 A1 | 3/2003 | Tokuda et al. | 73/627 |
| 2005/0211812 A1 | 9/2005 | Nakagawa et al. | 242/223 |

OTHER PUBLICATIONS

Finkl Cw, Benedet L, Andrews Jl., Laser Airborne Depth Sounder (LADS): A New Bathymetric Survey Technique In The Service Of Coastal Engineering, Environmental Studies, And Coastal Zone Management, published by Coastal Planning & Engineering, 2481 NW Boca Raton Boulevard, Boca Raton, Florida, date unknown.

* cited by examiner

*Primary Examiner*—Ian J Lobo
(74) *Attorney, Agent, or Firm*—Ralph J. Crispino; Abelman, Frayne & Schwab

(57) ABSTRACT

An underwater recognition device, system and method is provided. The system includes an underwater information collection sub-system for collecting sensor signals for underwater recognition. An underwater information processing sub-system is also provided, having at least one input port coupled to the underwater information collection sub-system and creating numerical or graphical representations of underwater information. In order to facilitate presentation of the information to a user, a speech signal processing sub-system integrated with the underwater information processing sub-system or coupled to an output port of the underwater information processing sub-system is provided. The speech signal sub-system processes numerical or graphical representations of underwater information into speech output signals.

10 Claims, 3 Drawing Sheets

US 7,646,675 B1

UNDERWATER RECOGNITION SYSTEM INCLUDING SPEECH OUTPUT SIGNAL

CROSS-REFERENCE TO RELATED APPLICATIONS

This application claims the benefit under 35 U.S.C. § 119(e) of U.S. Provisional Application No. 60/845,674 filed on Sep. 19, 2006 entitled "Depth Sounder With Synthetic Voice Auditory Output" and U.S. Provisional Application No. 60/931,822 filed on May 25, 2007 entitled "Depth Sounder Or Similar Electronic Output Device With Synthetic Voice Auditory Output", which are both fully incorporated by reference herein.

BACKGROUND ART

A wide variety of SONAR (sound navigation and ranging) units are used by anglers. These SONAR units may be commercialized as depth sounders or fish finders, and generally provide visual information on both the depth of the bottom (or other underwater structures) and the presence of fish below a boat hull, for instance, using a video display such as a liquid crystal display.

Existing depth sounders have grown quite sensitive, accurate and sophisticated over the last several years. In addition to showing a graphical representation of the bottom beneath a moving boat, modern depth sounders can display a three-dimensional image of the bottom structures (such as rock piles and the like) along with graphical representations specifically identifying sizes and numbers of fish.

While advantageous and able to graphically display very useful data, existing depth sounders are not without their limitations. In particular, when working fishing gear, it can be distracting for an angler to divert his attention from the fishing tackle, down-riggers, and the like, to view the graphical images being presented on the depth sounder. While the boat is moving, while down-riggers are being raised or lowered, while tackle is being added or removed, and while fish are being fought or landed, diversion of the angler's attention may lead to loss of boat control, loss of some fish, damage or loss of gear, or even injury to the angler. At a minimum, the angler will often find himself no longer fishing in productive waters. A wide variety of known depth sounder devices are known, including those described in U.S. Pat. Nos. 4,943,951; 5,537,380; and 6,198,692, which are incorporated by reference herein.

Certain attempts to remedy some of the aforementioned problems in conventional depth sounder systems and operation thereof have been made by including alarms that a user may present to provide a simple audio alert in the form of one or more "beeps" or "chirps" when certain parameters are met (e.g., bottom depth alarm, fish alarm or the like as programmed by a user). However, a user is clearly deprived of the variety of useful information provided by the sophisticated depth sounders or fish finders, since continuous feedback of underwater information is not possible without visual observation of the video display.

In light of the above, it would be desirable to provide improved depth sounders, for instance, advantageous to boaters, sport anglers or commercial fisherman. It would be particularly desirable for these improved devices to decrease the diversion of the user's attention from activities related to, for instance, working the boat gear or landing a fish, while enhancing the transfer of information from the depth sounder to the boater, angler or fisherman.

BRIEF SUMMARY OF THE INVENTION

An underwater recognition device, system and method is provided. The system includes an underwater information collection sub-system for collecting sensor signals for underwater recognition. An underwater information processing sub-system is also provided, having at least one input port coupled to the underwater information collection sub-system and creating numerical or graphical representations of underwater information. In order to facilitate presentation of the information to a user, a speech signal processing sub-system integrated with the underwater information processing sub-system or coupled to an output port of the underwater information processing sub-system is provided. The speech signal sub-system processes numerical or graphical representations of underwater information into speech output signals.

BRIEF DESCRIPTION OF THE FIGURES

The foregoing summary as well as the following detailed description of preferred embodiments of the invention will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings, where.

DETAILED DESCRIPTION OF THE FIGURES

Aquatic depth information devices, systems and methods are provided herein with the function of providing synthesized and/or prerecorded speech output. These devices, systems and methods allow users, such as boaters, sport anglers and commercial fisherman, to increase productivity by decreasing the attention required to observe video displays of marine depth information and other information typically provided by underwater recognition systems such as depth sounders or fish finders. This benefit is attained by providing speech output (related to one or more underwater conditions).

Depth sounders, fish finders or other similar electronic devices utilized by boaters, sport anglers and commercial fisherman conventionally include a SONAR system coupled to a control system including a visual display. Information is conveyed to a user through the visual display in the form of numerical digits representing bottom depth or the depth of structures, fish, or other objects under the water. When fishing, it can be difficult to keep your eye trained on the video display of the depth sounder when your attention is diverted by a need to operate the boat, cast your lure, adjust your tackle, open a beverage, or a variety of other activities.

Accordingly, herein provided are devices, systems and methods for providing the information to the user through informative speech signals, such as spoken information provided through a voice generator, retrieved from a selection of one or more prerecorded speech data, or a combination of spoken information provided through a voice generator and also retrieved from a selection of one or more prerecorded speech data. In addition, other data may also be collected by an underwater recognition system, for example, related to temperature or water turbidity, and this data may also be converted into a speech output.

Certain embodiments herein advantageously utilize many capabilities of existing depth sounders. For instance, many commercially available depth sounders provide detailed graphical displays showing bottom-depth, bottom structure (such as rock piles and the like), fish, and other objects under the water surface. Transducers for sending and receiving sound signals and processors for characterizing the underwater signals have become quite sophisticated, allowing three-dimensional graphical representations of the bottom surface, identification of the size, numbers, location, and direction of movement of fish, and the like.

Figure 1:
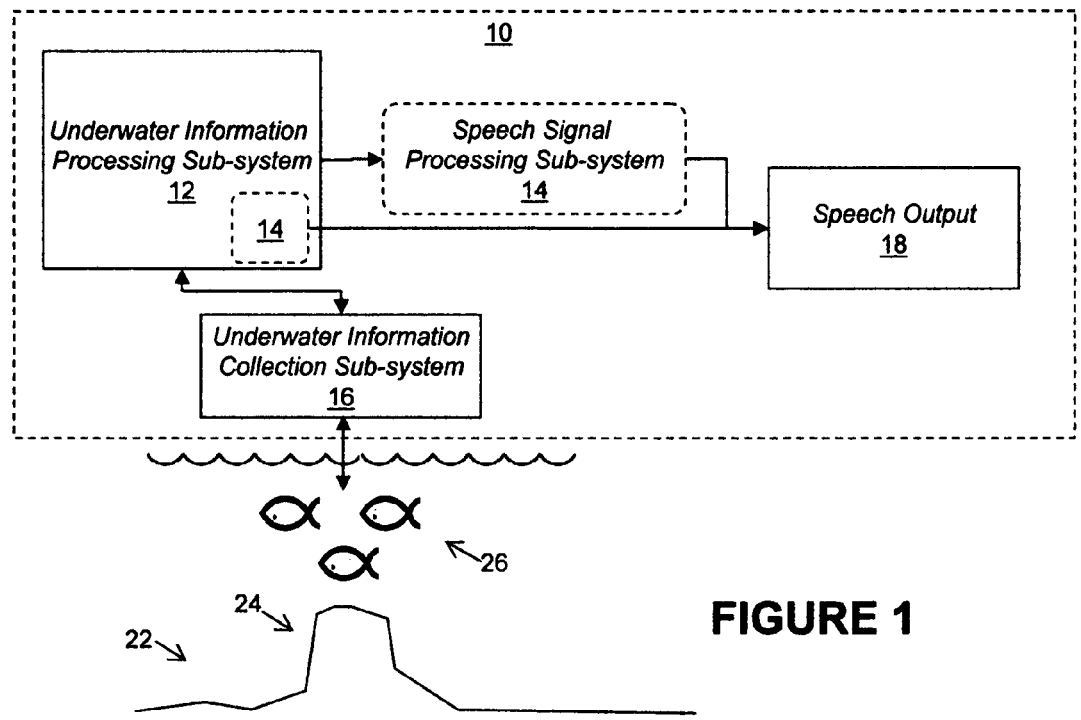
FIG. 1 shows a block diagram of related sub-systems of an underwater recognition system including speech output data.

Referring now to FIG. 1, an underwater recognition system 10 is shown, having the function of providing speech output signals 18 representative of one or more types of underwater information. The speech output signals 18 are converted to audio which is presented to one or more users through one or more loudspeakers integral with the system 10 or separate therefrom, through one or more headphone units, through one or more computing devices having audio functionality, and/or through one or more telephones. The one or more types of underwater information includes information pertaining to degree of change of the contour lines, water depth 22 (or "bottom depth"), depth of underwater obstacles 24, shape of underwater obstacles 24, size of underwater obstacles 24, quantity of fish or other aquatic animals 26, depth of fish or other aquatic animals 26, shape of fish or other aquatic animals 26, density of fish or other aquatic animals 26, and size of fish or other aquatic animals 26.

Accordingly, the system 10 generally includes an underwater information processing sub-system 12 and a speech output 18. In particular, the underwater information processing sub-system 12 is provided for controlling operation of the other components of the system 10, and is coupled with an underwater information collection sub-system 16. The information collection sub-system 16 generates sensor signals representative of one or more types of underwater information (e.g., the depth of obstructions to sound waves transmitted and received by the information collection sub-system 16, including but not limited to aquatic animals, bottom surface and geographical features, and transmits the signals to the underwater information processing sub-system 12. The underwater information processing sub-system 12 analyzes the sensor signals converts them to numerical (or graphical) representations of underwater information at a particular sampling instant, for instance, associated with one or more types of underwater information described herein. Certain of these numerical (or graphical) representations of underwater information at a particular sampling instant are processed by a speech signal processing sub-system 14, which generates the speech output signals 18.

The underwater information processing sub-system 12 may comprise any suitable operable combination of one or more processor(s) and memory devices including volatile memory devices as is well known to carry out the operations of interfacing the underwater information collection sub-system 16 for converting sensor signals into numerical (or graphical) representations of underwater information at sampling instants. In addition, the underwater information processing sub-system 12 may provide for user control, for example, through a suitable input apparatus (e.g., one or more buttons, touch screen interface, or input port for connecting a mouse and/or keyboard).

The speech signal processing sub-system 14 includes a voice generator for converting certain sampling instants of the numerical (or graphical) representations of underwater information into speech output 18 for presentation to users, or for converting certain sampling instants of the numerical (or graphical) representations of underwater information directly into speech output 18. For instance, suitable voice generators may comprise electronic hardware and/or software, a memory, and circuitry for driving a speaker so as to deliver speech output, and/or the like. Accordingly, synthesized speech output 18 indicative of underwater information or conditions is presented to users. For example, a voice generated utterance may be "35 feet to bottom." In another exemplary situation, where fish are present, a voice generated speech output 18 may be "medium fish 10 feet deep 2 feet from obstruction, clearance depth 8 feet, bottom 35 feet." These voice generated outputs may be created using voice generator software or firmware, for instance, as are known for personal computers, and telecommunications systems (e.g., messaging systems and voice response systems). In certain embodiments, a user may input words to be spoken by the voice generator when certain parameters are met. The user, knowing the location where he or she is fishing and the types of fish that fall within certain parameter ranges, may provide the words "target bass around underwater brush ahead" as associated with a certain set of parameters (e.g., obstruction, fish size and location, bottom surface depth greater than a predetermined safety value).

Alternatively, or in combination with a voice generator, the speech signal processing sub-system 14 includes prerecorded voice indicators stored, for instance, in a database or look-up table. The voice indicators have certain parameters or parameter ranges associated therewith. For example, a user may set the parameters for a target fish size for a particular day. The user, knowing the location where he or she is fishing and the types of fish that fall within certain parameter ranges, may record the spoken words "target bass around underwater brush ahead." This recording is stored in a voice indicator database along with appropriate parameters. Therefore, instead of receiving a voice generated speech output uttering the words "medium fish 10 feet deep 2 feet from obstruction, clearance depth 8 feet, bottom 35 feet," a more direct speech signal 18 may be provided in a user's or other individual's voice. Other messages may also be programmed by a user, for instance, as a voice reminder system.

Note that all or a portion of the speech signal processing sub-system 14 may be embedded in the underwater information processing sub-system 12, for instance, in the form of a computer-readable program stored on memory within the sub-system 12.

The speech output 18 may be presented to users through various audio devices such as loudspeakers and/or headphones. These loudspeakers and/or headphones may be coupled directly to the system 10 (wired or wireless connection), or may be used through one or more computing devices having audio functionality, and/or through one or more telephones. In further alternatives, the speech output 18 is uploaded via a data link to a remote server, for instance, over a wireless Internet link, and downloaded through one's computing device, where others can share this information substantially in real time over a designated private or public web page or other data link.

A computing device may be any type of device configured for computing, such as a personal computer, a mobile phone, a personal digital assistant, a personal navigation system, and so on. In addition, all or a portion of the underwater information processing sub-system 12 and/or all or a part of the speech signal processing sub-system 14 may be stored or otherwise embedded in a computing device, for instance, where such device may interface directly with the underwater information collection sub-system 16.

The underwater information collection sub-system 16 may include a SONAR device, as described above, typically wherein a transducer is mounted to the boat or vessel at a surface in contact with the water surface. A sound signal is emitted from the transducer and this signal travels through the water until it reaches the bottom, an obstruction or aquatic life, and then bounces back, to be picked up by a receiver, whereby the depth can be determined by calculating the amount of time it takes for the sound waves to return to the receiver. As a plurality of these sound wave transmission pluses are emitted and the return signals collected, representations of underwater depth information, as well as position and size information about obstructions or aquatic animals can be generated.

Other systems may be employed to provide underwater information, for example, based on optical information or based on stored data related to depth information at particular locations. For instance, the underwater information collection sub-system 16 may comprise an optical underwater recognition system, such as Laser Airborne Depth Sounding (LADS), wherein the underwater information collection sub-system 16 is located in a suitable line-of-sight position on an aircraft. By providing speech output 18 to a user, a pilot can provide more accurate data. For instance, conventionally, information is recorded and stored for subsequent research. However, it could be difficult for a pilot to return to a previous position that had some information of interest. Since spoken output is provided herein, a pilot may use that information to determine in real time whether a location warrants closer inspection and further samplings.

In still further embodiments, underwater information may be provided based on stored data that may be transmitted via a network such as the Internet, or based on other computer storage medium. For instance, one's position is determined by suitable positional location system (such as global positioning systems), and stored data is provided to users in the form speech output 18 as described herein. The stored data may be obtained, for instance, qualified institutions or entities, including research universities, governmental agencies or departments such as the National Oceanic & Atmospheric Administration, military organizations, and private entities.

By translating the digital display signal from conventional devices such as depth sounders and fish finders into speech output 18, an audio signal can be broadcast at various time intervals to alert the occupants of the boat of changes in the depth of the water, or of the depth of fish, without requiring direct eye contact with the unit. Timing of the speech output 18 may vary in response to values and/or rates of change of various numerical representations of underwater information across a span of sampling instants. For example, when the depth begins to change rapidly the unit could automatically speed up the rate at which the audio signals are announced, such that when the bottom is flat, the depth may be announced every 10, 20, or 30 seconds, and when the depth begins changing rapidly, the system announces depth information more frequently, for instance, about every 3 to 5 seconds.

Figure 2:
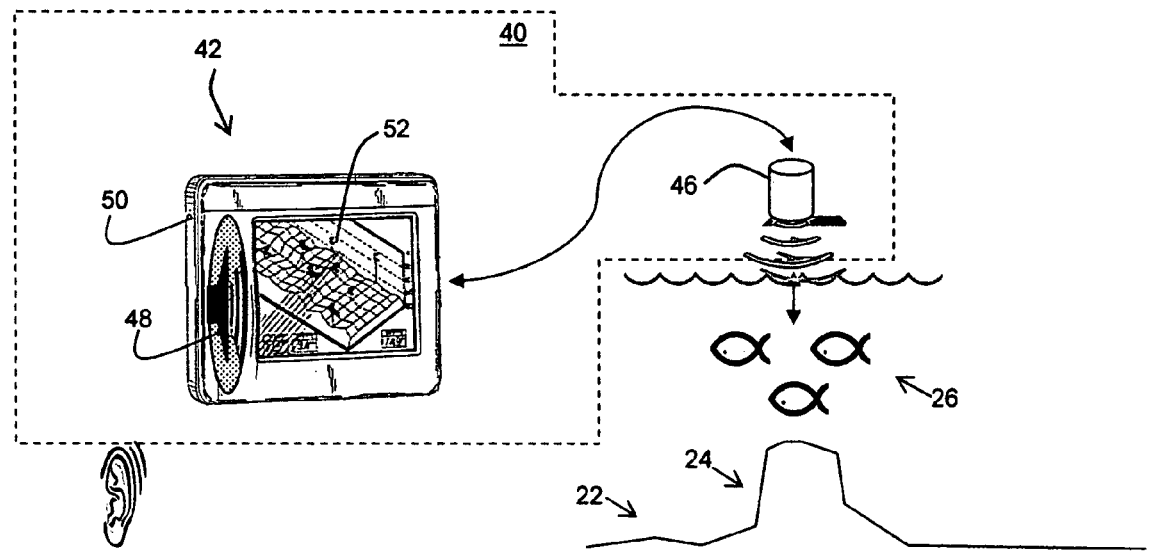
FIG. 2 shows a schematic view of an underwater recognition system including one or more loudspeakers for presenting underwater recognition information as speech output.

Referring now to FIG. 2, an embodiment of the underwater recognition system shown generally in FIG. 1 is depicted. An underwater recognition system 40 includes, for instance, a control device 42 coupled to a transducer 46. The control device 42 includes an integrated loudspeaker 48, whereby speech signals representing underwater information emanate directly from the control device 42. In certain alternative embodiments, or in conjunction with the loudspeaker 48, an audio output port 50 is provided within the device 42, wherein a user may connect any compatible external system capable of receiving the audio signals, including but not limited to an on board stereo, a portable stereo, amplified speakers, headphones, wireless adaptors that transmit signals to corresponding wireless headphones, and the like. In addition, device 42 may include a video display 52 as is conventionally known in underwater recognition systems such as depth sounders and fish finders. The control device 42 includes integrated therein an underwater information processing sub-system and speech signal processing sub-system as described with respect to FIG. 1.

Figure 3:
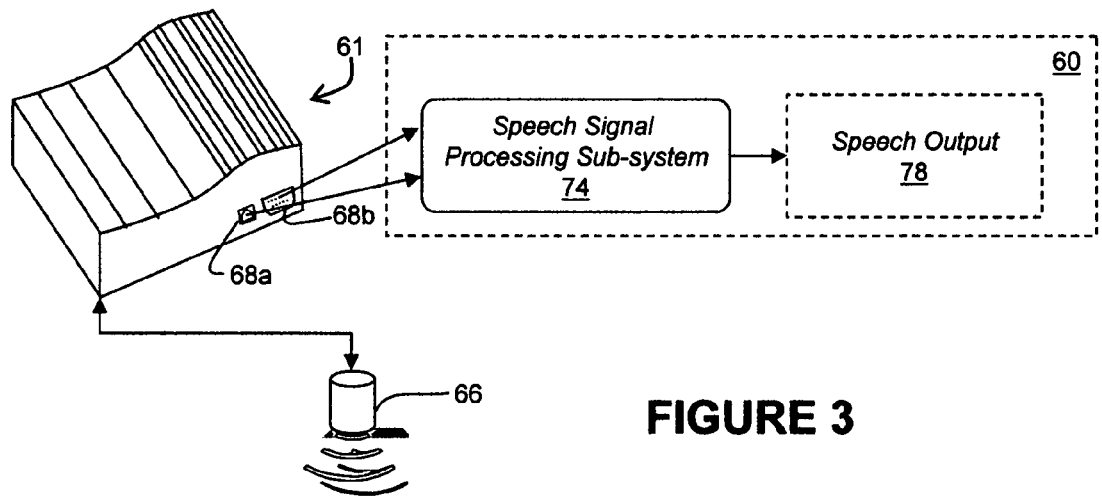
FIG. 3 shows a block diagram of related sub-systems of an underwater recognition system where speech output data is generated based on communication via one or more existing interface ports of an underwater recognition system control unit.

FIG. 3 shows an additional embodiment of a system including a conventional depth sounder or fish finder having a control device 61 transmitting signals to and receiving signals from a transducer device 66, and further including I/O ports 68a and 68b, for instance, in the form of a Universal Serial Bus (USB) port 68a, serial port 68b, or other I/O port (e.g., the CruzPro PcFF80 Fish Finder (commercially available from CruzPro Ltd., 35 Keeling Road #A4, Henderson 1008, New Zealand includes both a USB and RS-232 serial port). In conventional depth sounder devices These output ports on such conventional depth sounders or fish finders are utilized to interface the depth sounder with a personal computer, for the purpose of storing information and for using the video display of the personal computer instead of a limited display associated with many fish finders. The control device 61 includes integrated therein an underwater information processing sub-system as described with respect to FIG. 1. Accordingly, in certain embodiments hereof, a system 60 is provided including speech signal processing sub-system 74 that receives input data from the an underwater information processing sub-system (e.g., directly from the existing ports in communication with the processor and/or processor memory within the control device 61, whereby speech output 78 is generated as described above with respect to FIG. 1.

Figure 4:
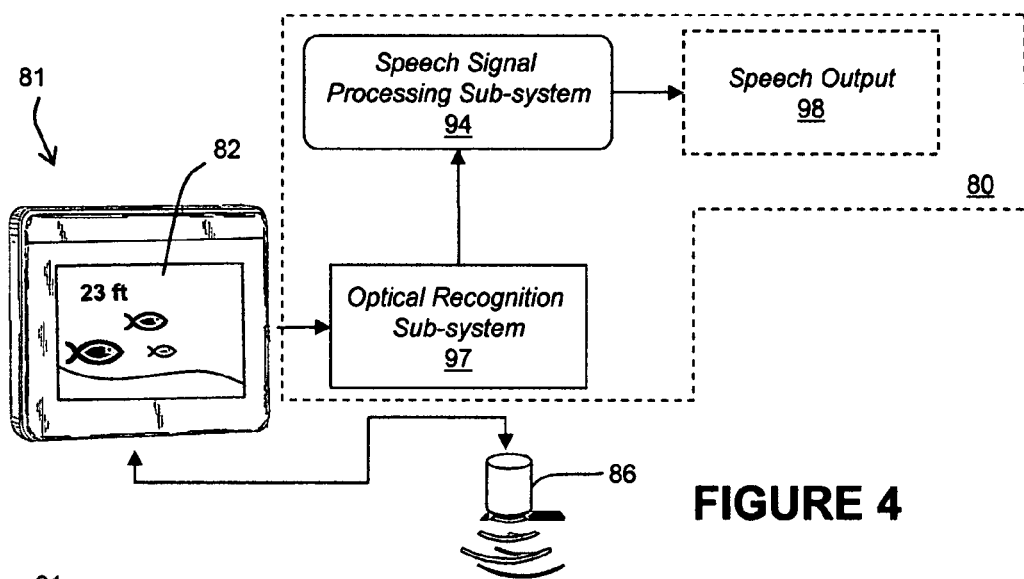
FIG. 4 shows a block diagram of related sub-systems of an underwater recognition system where the speech output data is generated based on optical recognition of information presented upon a video display of underwater recognition system control unit.
Figure 5:
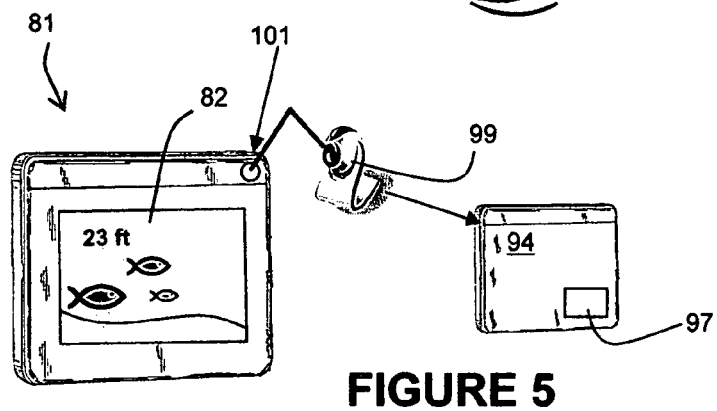
FIG. 5 shows a schematic view of an underwater recognition system having attached thereto an optical scanning device where the speech output data is generated based on conversion of the optical representations of the graphical information and/or numeric information upon the video display.

Referring now to FIG. 4, an underwater recognition system 80 is depicted, including a speech signal processing sub-system 94 that receives input from an optical recognition sub-system 97. Data is returned to the speech signal processing sub-system through an optical recognition sub-system 97. Accordingly, a control device 81 of a typical underwater characterizing system such as a SONAR system or the like includes a video display 82 and a transducer 86. Underwater information is obtained by optical scanning, for example, with suitable video capture devices 99 (FIG. 5) such as a suitable camera (charge-coupled device camera, CMOS camera, or other suitable optical scanner device). Accordingly, the speech signal processing sub-system 94 incorporates pattern recognition functionality and/or optical character recognition functionality. For instance, a speech signal processing sub-system 94 is supplied with a database containing the various symbols that may be encountered, and appropriate words associated with those symbols that may be converted into speech output 98. Optical Character Recognition (OCR) technology can also be used to be used to translate certain numerical representations upon the display 82 to digital form, then on to speech output 98. The fisherperson could thereby obtain audio functionality without replacing their existing unit by using the visual to audio conversion. As shown with respect to FIG. 5, video capture device 99 may be coupled to a stand-alone speech signal processing sub-system 94 having the optical recognition sub-system embedded therein. The video capture device 99 may be removably attached to the control device 81, for instance, with a clip, suction cup or other temporary adhesive device 101 that can be affixed to the display screen 82 of an existing depth sounder including the control device 81.

Figure 6:
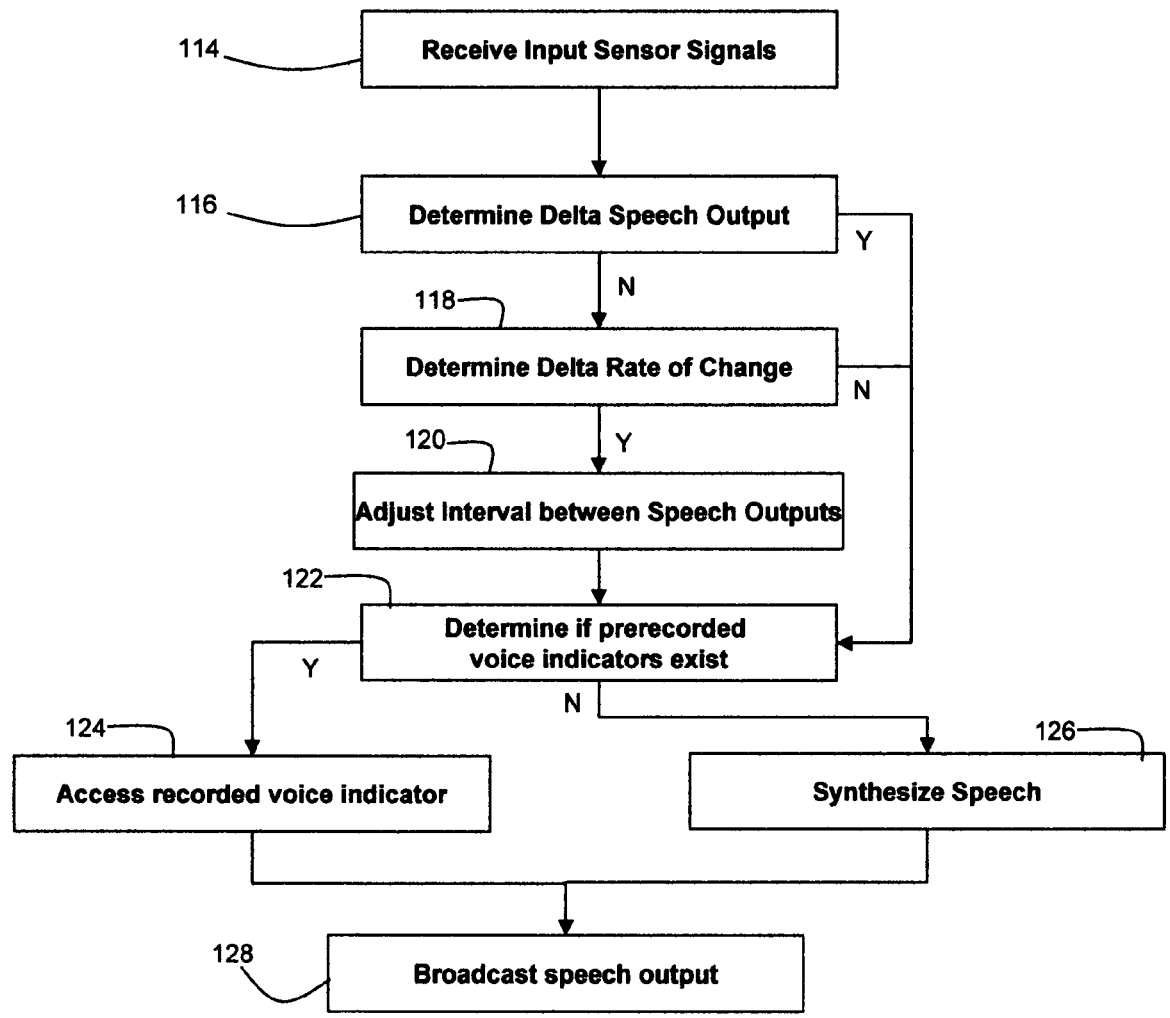
FIG. 6 shows a flowchart of process steps in one embodiment of an underwater recognition method including speech output.

Referring to FIG. 6, a process is shown for providing speech output to a user. At certain sampling instants, input sensor signals from an underwater information processing sub-system are received 114 by a speech signal processing sub-system. A determination is made 116 as to whether the time difference (or difference in the number of sampling instances) between most recent speech output and the current time (or current sampling instant) equals a predetermined maximum value. If it is determined 116 that the delta does not equal the predetermined maximum value, a determination 118 is made as to whether a rate of change of one or more parameters in the underwater information equals a predetermined maximum rate. If it is determined 116 that the delta between speech output instances does equal the predetermined maximum value, then the process may proceed either directly to processing by a voice generator to synthesize speech 126 (e.g., within the speech signal processing sub-system), or as shown, to a determination 122 as to whether the underwater information meets certain criteria value or ranges for one or more prerecorded voice indicators. If the underwater information does meet these criteria, based on, for instance, user defined information, then the process accesses 124 recorded voice indicators associated with the underwater information parameters. If no such records exist, the speech may be synthesized 126. Speech is broadcast 128 based on either recorded voice indicators or synthesized speech. Note that in the event a determination 118 is made indicating that that the rate of change of one or more parameters does meet or exceed a predetermined maximum rate, the predetermined maximum value of the time difference, or number of sampling instances, adjusts 120 accordingly. For example, if one is approaching a bottom depth and an increasing rate, the predetermined maximum value of the time difference, or number of sampling instances between speech outputs, decreases. In certain preferred embodiments, the system continuously provides speech output to a user, although the time periods between speech outputs may vary as described herein.

Certain aspects of the method and system described herein can be embodied in the form of computer-implemented processes and apparatuses for practicing those processes. The present method and system can also be embodied in the form of computer program code containing instructions, embodied in tangible media, such as floppy diskettes, CD-ROMs, hard drives, flash memory, or any other computer-readable storage medium, wherein, when the computer program code loaded into and executed by a computer, the computer becomes an apparatus for practicing certain aspects of the method and system. Certain aspects of the present method and system can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing certain aspects of the method and system. When the implementation is on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A system for providing audio feedback from an underwater information processing sub-system and associated display comprising:
    an optical recognition sub-system including a video capture device removably attachable to a display of an underwater information processing sub-system to capture graphical representations of underwater information; and
    a speech signal processing sub-system for converting video signals captured by the video capture device to speech including pattern recognition functionality and/or an optical character recognition functionality.

2. The system of claim 1, wherein the video capture device is removably attachable to a display with a clip, suction cup or temporary adhesive device.

3. The system of claim 1, wherein the video device is a charge-coupled device camera or a CMOS camera.

4. The system of claim 1, wherein the speech signal processing sub-system includes a database containing representations of symbols displayed on a display of a underwater information processing sub-system and associated speech representations for audio output.

5. The system of claim 1, wherein the speech signal processing sub-system translates numerical representations upon a display of an underwater information processing sub-system to digital form, and converts the digital form to a speech representation for audio output.

6. The system of claim 1, wherein the underwater information presented on a display of an underwater information processing sub-system includes a combination of symbols including contour lines, bottom depth, depth of underwater obstacles, shape of underwater obstacles, size of underwater obstacles, quantity of fish or other aquatic animals, depth of fish or other aquatic animals, shape of fish or other aquatic animals, density of fish or other aquatic animals, or size of fish or other aquatic animals, and
    the speech signal processing sub-system includes a database containing representations of symbols displayed and associated speech representations for audio output.

7. The system of claim 1, wherein at least a portion of the speech output is synthesized by a voice generator.

8. The system of claim 1, wherein at least a portion of the speech output includes recorded voice indicators selected based upon a certain type of underwater information.

9. The system of claim 1, wherein the speech output is provided at predetermined maximum intervals of time, and further wherein the predetermined maximum interval of time varies based on the rate of change of certain underwater parameters including bottom depth information.

10. The system of claim 1, wherein the speech signal processing sub-system includes computer-readable medium storing a program for providing optical pattern recognition or optical character recognition for converting text information and graphical representations into speech output.

* * * * *